United States Patent Office 2,862,818
Patented Dec. 2, 1958

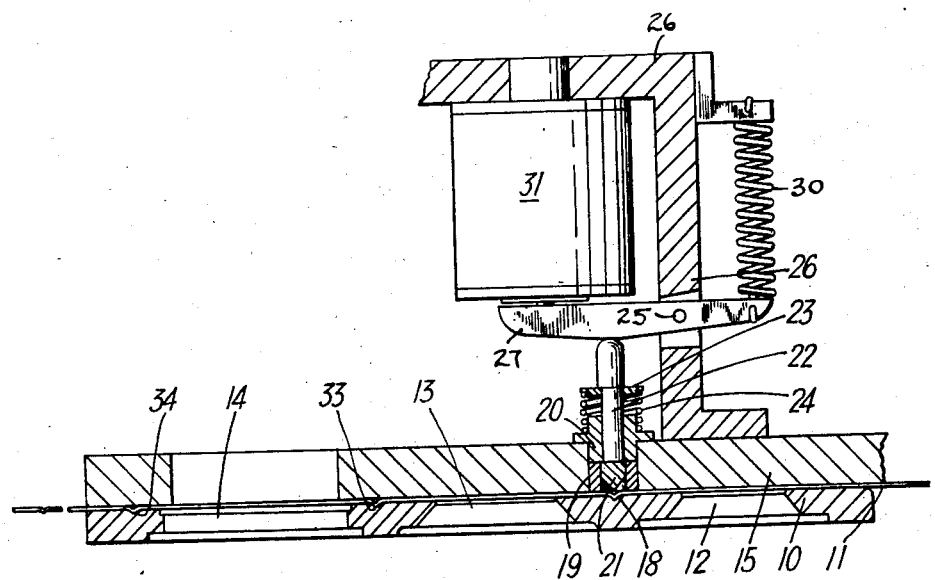

2,862,818

CONTINUOUS EXPOSURE-PROCESS-VIEW PROCESS WITH LIGHT SEALING MEANS

Frank Tyler, Christopher H. C. Walker and Eustace R. Townley, Glasgow, Scotland, assignors to Kelvin & Hughes Limited, Glasgow, Scotland Application May 3, 1955, Serial No. 505,825

Claims priority, application Great Britain May 4, 1954

4 Claims. (Cl. 96—27)

This invention relates to the prevention of fogging in photographic light sensitive materials used in rapid photographic processes of the type in which part of a photographic light sensitive material carried by a sheet base is processed immediately after exposure (the term "processed" being used herein to include developing and/or stabilising or fixing) and the developed image is projected or is viewed directly, while another part of said material is undergoing exposure or processing.

Photographic processes of the type referred to are frequently used in the photographing, processing and projection of images appearing on the screen of a cathode ray tube. The trace on the cathode ray tube is photographed on a photographic light sensitive base (i. e. a film) which is held flat in the film gate of a camera. The photographic light sensitive film then passes from the camera to a processing position whilst a new picture is taken at the exposure position, i. e. the position in front of the cathode ray tube. From the processing position, the film passes on to a projection position where an image thereof is projected upon a screen. In apparatus using such a process, the operation at the processing position is so timed that processing will be complete by the time the film is moved on to the projection position. In certain cases the image is not projected but is viewed directly.

With either of these viewing methods it would be necessary to use light other than safe light with the resultant danger of fogging occurring in the unexposed sections of the photographic light sensitive material due to scatter of light derived from the light source used for the projection or direct viewing of the developed latent image in the exposed sections of the material.

It is the object of this invention to prevent the fogging of unexposed sections of photographic light sensitive material caused by the scatter of light from light sources employed in the examination of the developed latent images in exposed sections of the same material in processes of the type in which exposure, processing and viewing, whether by projection or by direct viewing, are substantially continuous.

The light sensitive material is carried by a plastic film or like sheet base and light reaches the unexposed sections of the material by successive reflections, between the parallel walls of the base of said photographic light-sensitive material, of light from the said light source.

According to the present invention, in processes of the type specified, the light transmitted along the sheet base is re-directed substantially out of said base before reaching the unprocessed and unexposed parts of said material. The light in such parts may be totally reflected out of the base before said light reaches the unexposed parts of said material.

According to a preferred form of the invention a strip or sheet base carrying the photographic light sensitive material is "crimped" immediately after leaving the exposure station, said "crimping" resulting in the formation of a valley between the processed and unprocessed parts of said base, the angle of the valley thus formed being less than the critical angle total reflection of light in the base is obtained so that all light reaching this valley is then refracted out of the base.

This crimping may be effected by a V-shaped steel bar pressing the strip into a mating V slot located on the opposite side of the strip from that of the said V-shaped steel bar.

In a step by step process where the strip photographic light sensitive material is exposed in frames, as soon as one frame passes through the exposure station to the developer station, the crimper bar acts between that frame and the next unexposed frame. For instance, the crimper bar may be pressed downwards by means of pressure derived from a steel coil spring, which spring holds open the armature of a solenoid which is energised immediately prior to a frame transport. The energised solenoid withdraws the crimper bar, allows the strip material to move and is then de-energised so that the crimper bar again descends.

A similar effect may also be achieved by a series of perforations or cuts in the film so long as the film is bent in such a way that at the bend all light leaves the film because it is incident at less than the critical angle.

If desired however the film may be crimped before using it in the apparatus.

By way of example an apparatus for carrying out the invention is shown in the accompanying diagrammatic drawing in sectional view.

The apparatus comprises a base frame 10 which provides an upper guide surface for the sheet base 11 and has a camera or exposure opening 12, a chemical processing aperture 13, and a projection or viewing aperture 14. Above the frame 10 is a plate 15 the lower surface of which forms the upper guide surface for the sheet base 11. The frame 10 has a crimp forming recess 18 in its upper surface and the plate 15 has an opening 19 opposite to the recess 18 and provided with a bush 20 in which a reciprocable crimping bar 21 operates so as to press the sheet base into the recess. The bar 21 is carried by a stem 22 which carries a plate 23 engaged by a spring 24 whereby the bar is raised. The upper end of the stem 22 is engaged by a lever 27 pivoted at 25 to a frame member 26. The lever is pulled in one direction by a spring 30 to effect crimping and is at intervals pulled in the other direction by means of a solenoid 31. Means (not shown) are provided for moving the sheet base step by step through the guide surface and the solenoid 31 is operated in timed relation with the step by step movements. Thus the sheet base during or before exposure is crimped between the exposure and processing parts. The crimps are also maintained by providing crimping recesses 33, 34 on opposite sides of the viewing opening.

While there have been described above what are at present believed to be the preferred forms of this invention, it will be understood that various changes may be made therein by those skilled in the art without departing from the spirit of the invention. All such variations which fall within the true spirit of the invention are intended to be included in the appended claims in which generic terms have been employed to include all such variations and equivalent structures.

We claim:

1. A photographic process comprising the steps of simultaneously exposing, processing and viewing different portions of a photographic base carrying photographic material at different positions along its length, moving and guiding said base so that exposed portions move first to the processing position and then to the viewing position, and crimping said base at positions located between successive portions while said positions are disposed between the exposure position and the processing position, said crimping forming a valley in the strip at each such positions, the angle of the valley being selected such that the light which is required for viewing and which is transmitted along the base, is incident on the surface of the base at an angle less than the critical angle for total reflection of light in the base whereby this light is refracted out of said base before reaching the unprocessed and unexposed parts of said material.

2. A process as claimed in claim 1, wherein the valleys in the sheet base are also maintained on opposite sides of the viewing part.

3. An apparatus for carrying out the process of claim 1, comprising upper and lower guide surfaces, means for moving the sheet base through the guide surfaces, openings in one guide surface for exposure, processing and exhibiting respectively, a crimping recess in one of said surfaces, an opening in the other of said surfaces between the said exposure and processing openings, a reciprocable member in said latter opening for pressing the film into said recess, and means for operating said member in timed relation with the sheet base moving means.

4. The combination set forth in claim 3, said means for moving the sheet base having means providing step-by-step movement of said sheet base.

References Cited in the file of this patent

UNITED STATES PATENTS

| | | |
|---|---|---|
| 626,357 | Whitney | June 6, 1899 |
| 1,957,864 | Tuttle et al. | May 8, 1934 |
| 2,105,238 | Wittel | Jan. 11, 1938 |
| 2,568,373 | Sweet | Sept. 18, 1951 |

FOREIGN PATENTS

| | | |
|---|---|---|
| 641,639 | Great Britain | Aug. 16, 1950 |